United States Patent [19]

Meza

[11] 4,072,343

[45] Feb. 7, 1978

[54] REVERSIBLE AND ADJUSTABLE BILEVEL SEAT FOR DUAL-PURPOSE VEHICLE

[75] Inventor: Gonzalo Dario Vidal Meza, Peoria, Ill.

[73] Assignee: Caterpillar Tractor Co., Peoria, Ill.

[21] Appl. No.: 754,784

[22] Filed: Dec. 27, 1976

[51] Int. Cl.² .............................................. A47C 1/00
[52] U.S. Cl. .................................... 297/93; 248/429; 297/344
[58] Field of Search ................... 297/93, 94, 349, 344; 248/429, 430

[56] References Cited

U.S. PATENT DOCUMENTS

| | | | |
|---|---|---|---|
| 459,881 | 9/1891 | Cushing | 297/93 |
| 2,019,159 | 10/1935 | Saunders | 297/344 X |
| 2,784,768 | 3/1957 | Holopainen | 297/93 |
| 2,946,373 | 7/1960 | McCanse | 297/349 X |
| 3,027,131 | 3/1962 | Piccione | 248/429 |
| 3,246,926 | 4/1966 | Link | 297/93 |
| 3,622,202 | 11/1971 | Brown | 297/344 |

FOREIGN PATENT DOCUMENTS

| | | | |
|---|---|---|---|
| 7,556 of | 1894 | United Kingdom | 248/429 |
| 720,659 | 12/1954 | United Kingdom | 297/93 |

*Primary Examiner*—Francis K. Zugel
*Attorney, Agent, or Firm*—Wegner, Stellman, McCord, Wiles & Wood

[57] ABSTRACT

A seat for a dual-purpose vehicle having a first implement at the front and a backhoe at the rear includes a base, a translational assembly mounted for fore-and-aft adjustment on the base, with a latch operable either from the front or the rear, and a rotational assembly mounted for rotation about a transverse pivot axis on the translational assembly. The rotational assembly has first and second cushioned members at an angle of about 100° to one another, and rotates through an angle of about 80° between a forwardly facing position and a more elevated rearwardly facing position. A spring loaded plunger on a side of the translational assembly engages either of two holes in an adjacent part of the rotational assembly to lock the latter selectively in either of said positions.

14 Claims, 3 Drawing Figures

REVERSIBLE AND ADJUSTABLE BILEVEL SEAT FOR DUAL-PURPOSE VEHICLE

BACKGROUND OF THE INVENTION

As the cost of heavy equipment such as wheel loaders and track loaders increased, it becomes more and more desirable to provide such units which may also carry a rear-mounted implement such as a backhoe. In order for the operator to run the backhoe efficiently, he must be able to sit facing it, so such vehicles are provided with a reversible seat.

However, the location of the backhoe controls is such that the design of a seat apparatus for efficient backhoe operation also presents the problems of elevating the seat and moving it rearwardly. The design of such apparatus is complicated by the restricted space and by the desirability of using previously available components and subassemblies.

SUMMARY OF THE INVENTION

The present invention is directed to overcoming one or more of the problems as set forth above.

According to the present invention, one or more of the foregoing problems is solved by providing a base fixed to the vehicle platform, a translational assembly comprising a bottom panel and parallel upright side panels mounted on the base for fore-and-aft adjustment and provided with a manual latch for securing the translational assembly selectively in various adjusted positions, and a rotational assembly mounted between the side panels for rotation about a transverse pivot axis. The rotational assembly includes first and second cushioned members mounted between parallel upright arms which have aligned pivots rotatable in sockets in the side panels of the translational assembly. The rotational assembly may be turned about the pivot axis between a forwardly facing position with the first cushioned member forming a seat, and rearwardly facing position with the second cushioned member forming a seat. In each position on the other cushioned member forms a backrest. The pivot axis is so located that the seat is at a higher level in the rearwardly facing position; and means are provided for selectively locking the rotational assembly to the translational assembly in either of said positions.

THE DRAWINGS

DETAILED DESCRIPTION OF THE INVENTION

Figure 1:
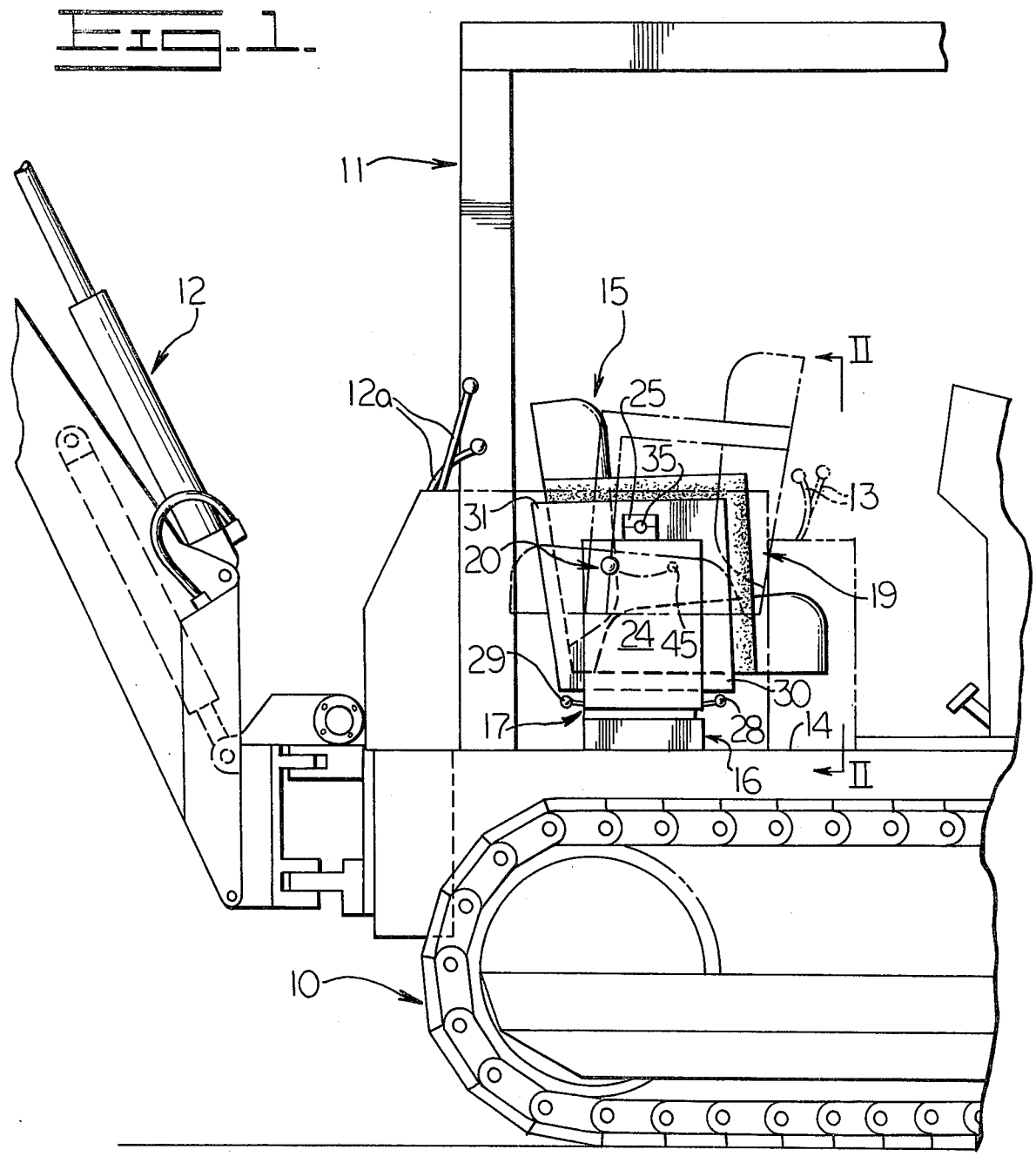
FIG. 1 is a fragmentary side elevational view of a dual-purpose vehicle with the seat apparatus of the invention illustrated in full lines in a forwardly facing position and in broken lines in a rearwardly facing position.
Figure 2:
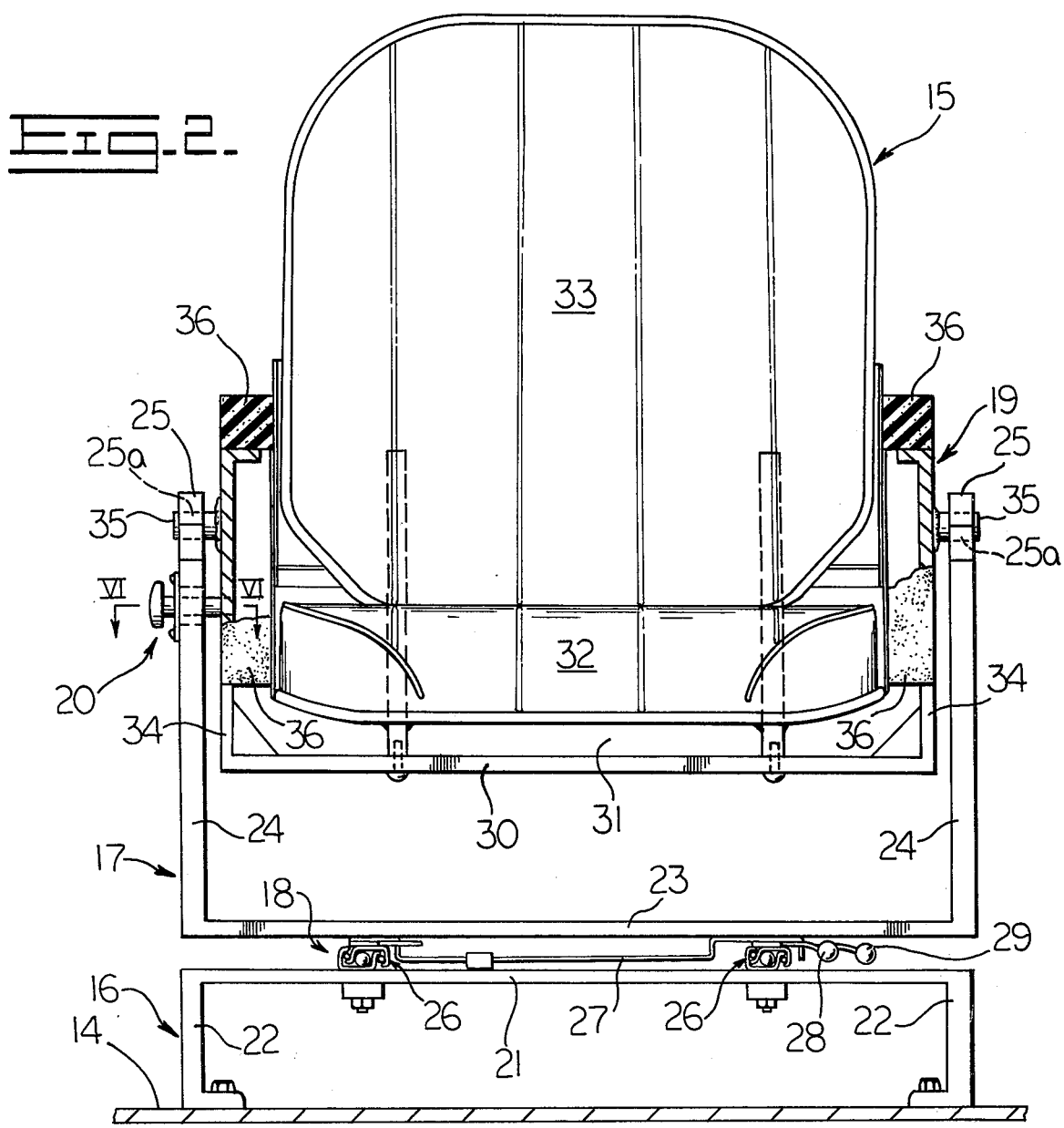
FIG. 2 is a fragmentary sectional view on an enlarged scale taken substantially as indicated along the line II—II of FIG. 1.

A dual-purpose vehicle, indicated generally at 10, has an operator's station, which in the illustrated vehicle is a cab, indicated generally at 11, and at the rear of the vehicle is mounted a backhoe, indicated generally at 12, the controls 12a of which are mounted on the platform 14 of the vehicle to the rear of the cab 11. Not illustrated in the drawing is a first implement such as a loading bucket which is mounted on the front of the vehicle, and controls 13 for the loading bucket are mounted in the front of the cab at a level lower than that of the controls 12a. A reversible and adjustable seat apparatus, indicated generally at 15, which is the subject of the present invention, is mounted upon the platform 14 of the vehicle in the cab 11. As best seen in FIG. 2, the seat apparatus 15 includes a base, indicated generally at 16; mounting means in the form of a translational assembly, indicated generally at 17; means, indicated generally at 18, for adjusting the translational assembly 17 fore and aft on the base; a rotational assembly, indicated generally at 19; and locking means, indicated generally at 20, for locking the rotational assembly selectively in either the forwardly facing, full line position of FIG. 1 or in the rearwardly facing broken line position of FIG. 1.

The base 16 is a horizontal plate 21 mounted upon legs 22 which are bolted to the vehicle platform 14.

The translational assembly consists of a bottom member 23 and parallel upright side members 24 at the upper ends of which are aligned trunions 25 providing sockets 25a.

The means mounting the translational assembly 17 consists of a pair of three-ball bearing tracks 26 which are mounted upon the base 16 and have manually releasable latch means 27 provided with a first handle 28 near one end of the translational assembly bottom panel 23, and a second manual release handle 29 adjacent the opposite end of said panel 23. Except for the provision of the second manual release handle 29, the means 18 is a commercially available sub-assembly which is generally similar to the mechanism for adjusting an automobile seat fore and aft.

The rotational assembly 19 includes a first transverse plate 30 and a second transverse plate 31 which are fixed at an angle of about 100° to one another, with a first cushioned member 32 secured to the first transverse plate 30 and a second cushioned member 33 secured to the second transverse plate 31. Flanking the transverse plates 30 and 31 are parallel, upright arms 34 which are immediately adjacent to the upright side panels 24. Toward the upper ends of the arms 34 are laterally outwardly extending aligned pivots 35 which are journalled in the sockets 25a provided by the trunions 25. Thus, the rotational assembly 19 is rotatable about the pivot axis formed by the aligned pivots 35 in the sockets 25a between the forwardly facing, solid line position of FIG. 1 and the rearwardly facing, broken line position of FIG. 1. The location of the pivot axis is such that the rearwardly facing position of the rotational assembly 19 is higher than the forwardly facing position of the rotational assembly. In the forwardly facing position, the first cushioned member 32 forms a seat while the second cushioned member 33 forms a backrest; while in the rearwardly facing position the second cushioned member 33 forms the seat while the first cushioned member 32 forms the backrest. The angle of approximately 100° between the first transverse plate 30 and the second transverse plate 31 gives a comfortable pitch to the backrest; and in moving from the forwardly facing to the rearwardly facing position, the rotational assembly 19 rotates through an angle of approximately 80°, so that the cushioned member forming the seat in each position is horizontal.

The proper location of the pivots 35 and trunions 25 to position the pivot axis properly is determined in the following manner:

1. The desired forwardly facing position of the cushions 32 and 33 is drawn;
2. The desired rearwardly facing position of the cushions 32 and 33 is drawn;
3. The angle is laid out between the intersection of the seating surface of the cushion 32 in its forwardly facing position and in its rearwardly facing position, and a line is drawn bisecting that angle;
4. The angle is laid out between the intersection of the seating surface of the cushion 33 in its forwardly facing position and in its rearwardly facing position, and a line is drawn bisecting that angle;
5. The pivot point is where the bisecting lines meet.

As indicated in FIG. 2 the arms 34 are covered with sponge rubber or foamed plastic cushions 36 which afford padded arm rests both in the forwardly facing and in the rearwardly facing positions of the rotational assembly 19.

Figure 3:
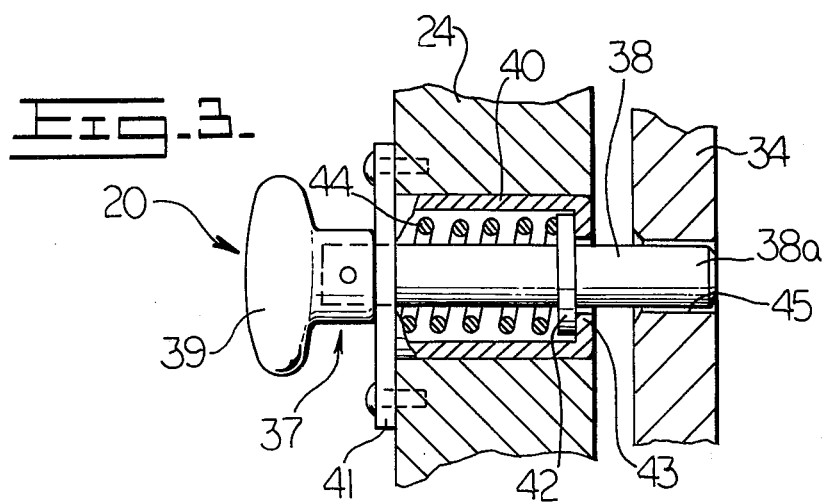
FIG. 3 is a fragmentary sectional view on an enlarged scale taken substantially as indicated along the line III—III of FIG. 2.

Referring now particularly to FIG. 3, the selective locking means 20 consists of a spring pressed plunger, indicated generally at 37, which has a shank 38 and a knob 39. A sleeve 40 extends through one of the side panels 24 and has a peripherally extending mounting flange 41 by means of which it is secured in a hole in said side panel. The plunger 38 impales the side panel within the sleeve 40 and has a circumferential skirt 42 which bears upon a radially inturned flange 43 of the sleeve 40 so that a compression spring 44 which surrounds the shank 38 within the sleeve 40 may bias the spring pressed plunger 37 to the position illustrated in FIG. 3. An end portion 38a of the plunger 38 engages one of two holes 45 in the adjacent arm 34, and the holes 45 are 80° apart so that the plunger locks the seat selectively either in its forwardly facing or its rearwardly facing position.

It is apparent that if desired the transverse plates 30 and 31 of the rotational assembly 19 may be hingedly connected to one another and provided with suitable means for changing the angle between them to suit the wishes of the operator who is using the vehicle.

It is also apparent that, if desired, the side plates 24 of the translational assembly 17 may be independent of the bottom plate 23, and may be mounted upon conventional shock absorbing supports of the general type taught in U.S. Letters Pat. No. 3,109,621, issued Nov. 5, 1963 to Bostrom Corporation upon an invention of Simons, Radke, and Tengler.

It is apparent from the foregoing detailed description that the present invention provides a very simple and compact reversible and adjustable seat apparatus for a cab of a dualpurpose vehicle which has a first implement at the front and a backhoe at the rear, with the backhoe controls at a level higher than the first implement controls.

In addition to providing a simple and inexpensive apparatus for the purpose, the invention permits the use of commercially available three-bearing assemblies for fore-and-aft adjustment, modified only by providing them with an extra latch operating handle.

Furthermore, all the components of the apparatus are simple, rugged, and require no manufacturing to close tolerances.

The foregoing detailed description is given for clearness of understanding only and no unnecessary limitations should be understood therefrom as modifications will be obvious to those skilled in the art.

The embodiments of the invention in which an exclusive property or privilege is claimed are defined as follows:

1. A reversible and adjustable seat apparatus for an operator's station of a dual-purpose vehicle having a first implement at the front and a backhoe at the rear with backhoe controls which are higher above the vehicle platform than are the first implement controls, said seat apparatus comprising, in combination:
   a base fixed to the vehicle platform;
   mounting means on the base comprising parallel upright side members;
   a rotational assembly comprising a first transverse plate, a first cushion member secured to said first transverse plate, a second transverse plate, a second cushion member secured to said second transverse plate, parallel upright arms flanking said plates immediately adjacent the upright side members, and aligned pivots on said arms journalled in sockets in said side members to define a pivot axis on which the rotational assembly may be turned between a forwardly facing position with the first cushion member forming a seat while the second cushion member forms a backrest, and a rearwardly facing position with the second cushion member forming a seat while the first cushion member forms a backrest, said pivot axis being so located that the seat is at a higher level in the rearwardly facing position, and being at the intersection of planes which bisect the following angles;
   (a) the angle between the seating surface of the first cushion member in its forwardly facing position and in its rearwardly facing position, and
   (b) the angle between the seating surface of the second cushion member in its forwardly facing position and in its rearwardly facing position;
   and means for selectively locking said rotational assembly to said mounting means in either of said positions.

2. The combination of claim 1 in which the selective locking means comprises a plunger slidably impaling one of the side members, said plunger having an inner end portion which seats selectively in either of two holes in the adjacent upright arm, and means for retaining said inner end of the plunger in a selected one of said two holes.

3. The combination of claim 2 in which the means for retaining said inner end portion in one of said two holes comprises a spring.

4. The combination of claim 1 in which the first and second transverse plates are at a fixed angle to one another of about 100°, and the rotational assembly turns through an angle of about 80°.

5. The combination of claim 1 in which the mounting means is a translational assembly which includes a bottom member connecting said upright side members, and means are provided which mount said translational assembly on the base for fore-and-aft adjustment, said means including a manual latch for securing the translational assembly selectively in various adjusted positions.

6. The combination of claim 5 in which the manual latch has a first actuating arm adjacent the front of the translational assembly and a second actuating arm adjacent the rear of the translational assembly.

7. A reversible and adjustable seat apparatus for an operator's station of a dual-purpose vehicle having a first implement at the front and a backhoe at the rear with backhoe controls which are higher above the vehicle platform than are the first implement controls, said seat apparatus comprising, in combination:

a base fixed to the vehicle platform;

a translational assembly which includes a transversely extending bottom member which forms the lowermost part of said translational assembly and upright side members of substantial height supported upon said bottom member;

adjusting means on the bottom member mounting said translational assembly on the base for fore-and-aft adjustment, said adjusting means being of small height so the bottom member of the translational assembly is close to the base;

a manual latch for securing the translational assembly selectively in various adjusted positions;

a rotational seat assembly comprising a first transverse plate, a first cushion member secured to said first transverse plate, a second transverse plate, a second cushion member secured to said second transverse plate, said plates and cushion members being longer from front to rear than is said translational assembly, parallel upright arm rests flanking said plates and connected thereto between and immediately adjacent the upright side members, and aligned pivots on said arm rests journalled in sockets which surmount said side members of the translational assembly to define a pivot axis on which the rotational assembly may be turned between a forwardly facing position with the first cushion member forming a seat while the second cusion member forms a backrest, and a rearwardly facing position with the second cushion member forming a seat while the first cushion member forms a backrest, said pivot axis being so located that the seat is at a higher level in the rearwardly facing position;

and locking means on an upright side member which is releasably engageable with one of the arm rests for selectively locking said rotational assembly to said translational assembly in either of said positions.

8. The combination of claim 7 in which the manual latch has a first actuating arm adjacent the front of the translational assembly and a second actuating arm adjacent the rear of the translational assembly.

9. The combination of claim 7 in which the selective locking means comprises a plunger slidably impaling said one of the side members, said plunger having an inner end portion which seats selectively in either of two holes in the adjacent upright arm rest, and spring means for retaining said inner end of the plunger in a selected one of said two holes.

10. The combination of claim 7 in which the position of the pivot axis is at the intersection of planes bisecting the following angles
    (a) the angle between the seating surface of the first cushion member in its forwardly facing position and in its rearwardly facing position, and
    (b) the angle between the seating surface of the second cushion member in its forwardly facing position and in its rearwardly facing position.

11. The combination of claim 7 in which the adjusting means includes a manual latch for securing the translational assembly selectively in various adjusted positions.

12. The combination of claim 11 in which the manual latch has a first actuating arm adjacent the front of the translational assembly and a second actuating arm adjacent the rear of the translational assembly.

13. The combination of claim 7 in which the pivot sockets are provided by trunnions which surmount the side members.

14. The combination of claim 7 in which said pivots and said locking means constitute the only means supporting the rotational assembly on the mounting means in any position of said rotational assembly.

* * * * *